US012614872B2

(12) United States Patent
Shen

(10) Patent No.: US 12,614,872 B2
(45) Date of Patent: Apr. 28, 2026

(54) PLUG FOR A CONNECTOR AND THE CONNECTOR

(71) Applicant: Sungrow Power Supply Co., Ltd., Hefei (CN)

(72) Inventor: Zhanliang Shen, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 428 days.

(21) Appl. No.: 18/461,451

(22) Filed: Sep. 5, 2023

(65) Prior Publication Data

US 2024/0113467 A1 Apr. 4, 2024

(30) Foreign Application Priority Data

Sep. 29, 2022 (CN) ......................... 202222600206.0

(51) Int. Cl.
*H01R 13/00* (2006.01)
*H01R 13/502* (2006.01)
*H01R 13/512* (2006.01)

(52) U.S. Cl.
CPC ....... *H01R 13/5025* (2013.01); *H01R 13/512* (2013.01)

(58) Field of Classification Search
CPC .......................... H01R 13/517; H01R 13/5025
See application file for complete search history.

(56) References Cited

U.S. PATENT DOCUMENTS 6,383,022 B1 5/2002 Murakami et al.
8,992,246 B2 * 3/2015 Tian ...................... H01R 12/88 439/331
9,153,893 B2 * 10/2015 Yamada .................. H01R 9/24
(Continued)

FOREIGN PATENT DOCUMENTS

| | | |
|---|---|---|
| CN | 210607880 U | 5/2020 |
| CN | 212849026 U | 3/2021 |
| JP | H04-58975 U | 5/1992 |

(Continued)

OTHER PUBLICATIONS

Extended European Search Report for European Application No. 23195055.1, dated Feb. 26, 2024.
(Continued)

*Primary Examiner* — Phuong Chi Thi Nguyen
(74) *Attorney, Agent, or Firm* — Wolf, Greenfield & Sacks, P.C.

(57) ABSTRACT

A plug for a connector and the connector are provided. The plug includes an elastic main body, the elastic main body is provided with multiple through holes for cables to pass through; the plug includes a support body, the support body includes a first support body embedded in a middle part of the elastic main body, the through holes are provided around the first support body, and the support body has a hardness greater than that of the elastic main body. In this application, due to the elastic material characteristics of the elastic main body, when the claw members are squeezed by the first nut to contract and then the claw members force the plug tightly from periphery, the plug can generate a certain deformation to be tightly clamped by the claw members and press the cables from the outside to the middle part.

13 Claims, 4 Drawing Sheets

(56) References Cited

U.S. PATENT DOCUMENTS

| | | | | |
|---|---|---|---|---|
| 9,608,362 | B2 * | 3/2017 | Jelak | H01R 13/521 |
| 9,813,019 | B2 * | 11/2017 | Zhong | H01R 13/6641 |

FOREIGN PATENT DOCUMENTS

| | | | |
|---|---|---|---|
| JP | 2000-353567 | A | 12/2000 |
| JP | 2007-080783 | A | 3/2007 |
| JP | 2008-166045 | A | 7/2008 |
| JP | 2015-191831 | A | 11/2015 |
| JP | 2016-186851 | A | 10/2016 |
| KR | 20110139439 | A | 12/2011 |

OTHER PUBLICATIONS

First Office Action for Japanese Application No. 2023-145687, mailed Jul. 30, 2024.

* cited by examiner

PLUG FOR A CONNECTOR AND THE CONNECTOR

CROSS REFERENCE TO RELATED APPLICATIONS

This application claims the priority to Chinese Patent Application No. 202222600206.0 titled "PLUG FOR A CONNECTOR AND THE CONNECTOR", filed with the China National Intellectual Property Administration on Sep. 29, 2022, which is incorporated herein by reference in its entirety.

FIELD

The present application relates to the technical field of electrical elements, and in particular to a plug for a connector as well as the connector.

BACKGROUND

Currently, a connector is used for a cable assembly to pass through. The cable assembly includes a cable and a contact pin, when the connector is connected to a corresponding device, the contact pin is inserted to the corresponding electrical element for connection. The connector is provided with a plug, and the cable passes through the plug. When the plug is clamped by the connector, the cable can be clamped well, but when multiple cables run through the plug, the cables cannot be effectively clamped.

SUMMARY

A plug for a connector is provided according to the present application. The plug includes an elastic main body, the elastic main body is provided with multiple through holes for cables to pass through. The plug further includes a support body, the support body includes a first support body embedded in said elastic main body, and the multiple through holes are provided around the first support body, and a hardness of the support body is greater than that of the elastic main body.

In a specific embodiment, each of the through holes has a circular cross-section, each side of a cross section of the first support body is a concave arc, and the concave arc directly faces the corresponding through hole and is concentric with the corresponding through hole.

In a specific embodiment, the support body further includes a second support body, and the second support body and the first support body are arranged around at least one of the through holes.

In a specific embodiment, the second support body is located on an outer side of the through holes and faces a portion between adjacent through holes.

In a specific embodiment, at least a portion of the second support body is located between adjacent through holes.

In a specific embodiment, the through holes and the elastic main body each has a circular cross-section, a profile of the cross-section of the second support body includes two lateral sides and a base side, these sides meet each other in sequence, each of the two lateral sides is a concave arc and the base side is a convex arc. The concave arc is concentric with a corresponding through hole and the convex arc is concentric with the elastic main body, and a position where the two lateral sides meet each other faces a portion between adjacent through holes.

In a specific embodiment, there are multiple support bodies, and the multiple support bodies are independent of each other or connected to each other. Alternatively, part of the multiple support bodies are independent of each other, and another part of the multiple support bodies are connected to each other.

In a specific embodiment, the support body is made of metal or plastic.

A connector including the plug for the connector according to any one of the above embodiments is further provided in the present application. The connector further includes a connecting seat and a first nut, the connecting seat is provided with a first external thread section having external threads; the first external thread section is connected to multiple claw members, and the plug is located within the multiple claw members; the first nut and the first external thread section are in threaded engagement to drive the claw members to clamp the plug tightly.

In a specific embodiment, one end of the connecting seat away from the claw members is provided with a second external thread section, and the connector is provided with a second nut in threaded engagement with the second external thread section.

In this application, due to the elastic material characteristics of the elastic main body, when the claw members are squeezed by the first nut to contract and then the claw members force the plug tightly from periphery, the plug can generate a certain deformation to be tightly clamped by the claw members and press the cables from the outside to the middle part. Besides, because the middle part is provided with the support body having a greater hardness, which is equivalent to a middle skeleton of the plug, the problem that the elastic main body easily slacks due to insufficient support in the middle part of can be solved, and thereby it is ensured that the cables are clamped well during the clamping process.

Figure 1:
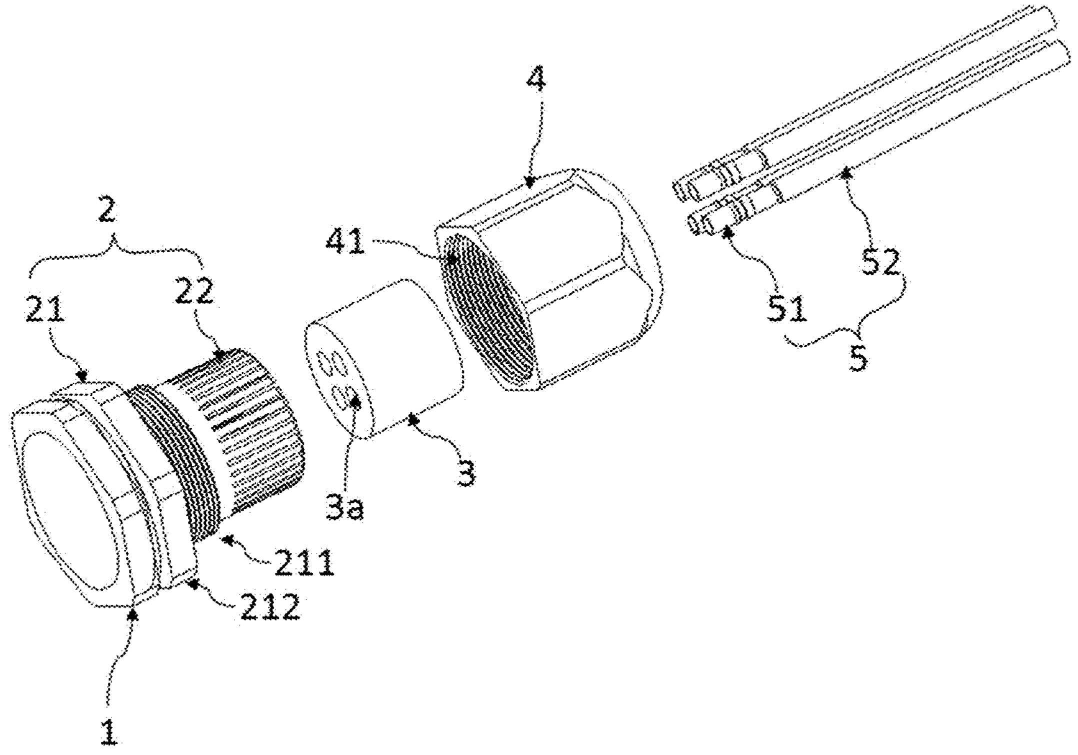
FIG. 1 is an exploded view of a connector according to a first embodiment of the present application.

Reference numerals:

| | | | |
|---|---|---|---|
| 100 | cabinet wall, | 1 | second nut, |
| 2 | connecting seat, | 21 | main body portion, |
| 211 | first external thread section, | 212 | annular flange, |
| 213 | second external thread section, | 22 | claw member, |
| 3 | plug, | 3a | through hole, |
| 31 | elastic main body, | 321 | first support body, |
| 322 | second support body, | 4 | first nut, |
| 5 | cable assembly, | 51 | contact pin, |
| 52 | cable. | | |

DETAILED DESCRIPTION OF THE EMBODIMENTS

In order to make those skilled in the art better understand the solutions of the present application, the present application will be illustrated in detail below in combination with the attached drawings and specific embodiments.

First Embodiment

Figure 2:
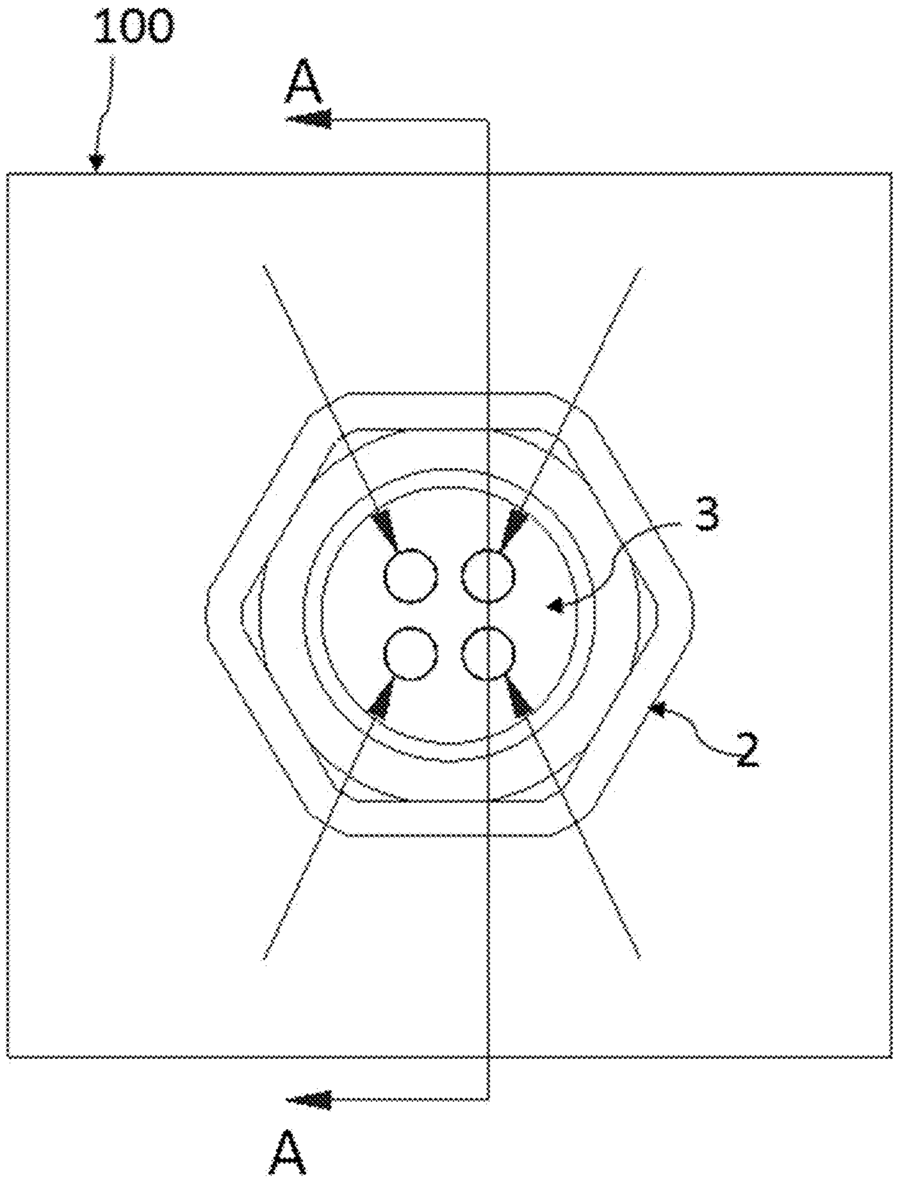
FIG. 2 is a schematic view showing the connector in FIG. 1 being mounted to a cabinet.
Figure 3:
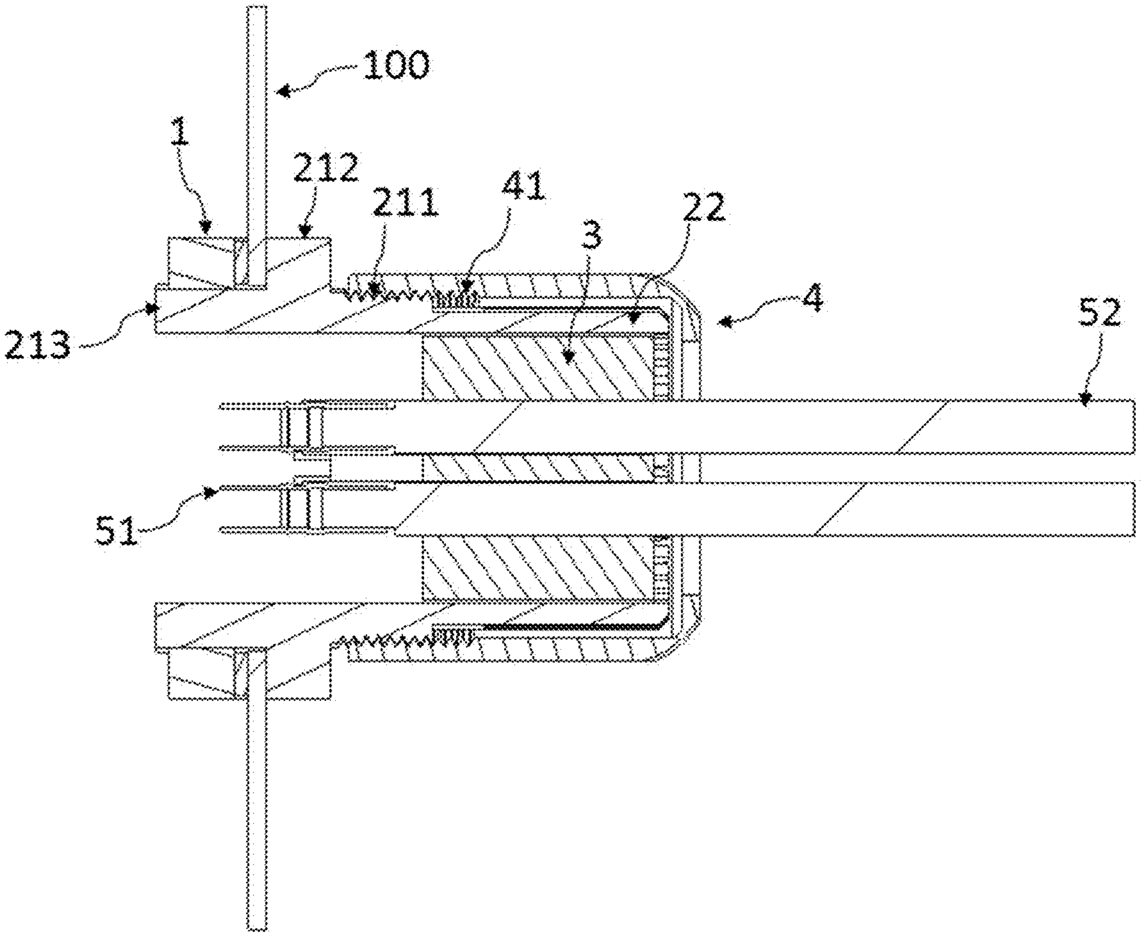
FIG. 3 is a cross-sectional view taken along line A-A in FIG. 2.

Please refer to FIG. 1 to FIG. 3, FIG. 1 is an exploded view of a connector according to a first embodiment of the present application; FIG. 2 is a schematic view showing the connector in FIG. 1 being mounted to a cabinet; and FIG. 3 is a cross-sectional view taken along line A-A in FIG. 2.

The connector in this embodiment includes a connecting seat 2, a plug 3, and a first nut 4. The connecting seat 2 includes a main body portion 21, the main body portion 21 is provided with a first external thread section 211 having external threads. The first external thread section 211 is connected to multiple claw members 22, and these claw members 22 are distributed in a circumferential direction to surround an end of the first external thread section 211. The multiple claw members 22 are arranged in a surrounding manner to form a cylinder, and the plug 3 is located within the multiple claw members 22. The plug 3 is provided with through holes 3*a* for cables 52 to pass through. Specifically, multiple through holes 3*a* are provided, for example, two or more through holes 3*a*; in FIG. 1, there are four through holes 3*a*, so that multiple cables 52 can be mounted. As shown in FIG. 1, a cable assembly 5 includes cables 52 and contact pins 51 connected to the cables 52, and the cables 52 pass through the through holes 3*a*. When the first nut 4 has not yet been connected to the connecting seat 2, the claw members 22 does not clamp the plug 3, and when the first nut 4 is in threaded engagement with the first external thread section 211, since the first nut 4 has an end opening, during the rotation and tightening process, the claw members 22 can be pressed radially to contract and thus the plug 3 is clamped tightly. At this time, the claw members 22 and the plug 3 are located in an inner hole of the first nut 4.

Figure 4:
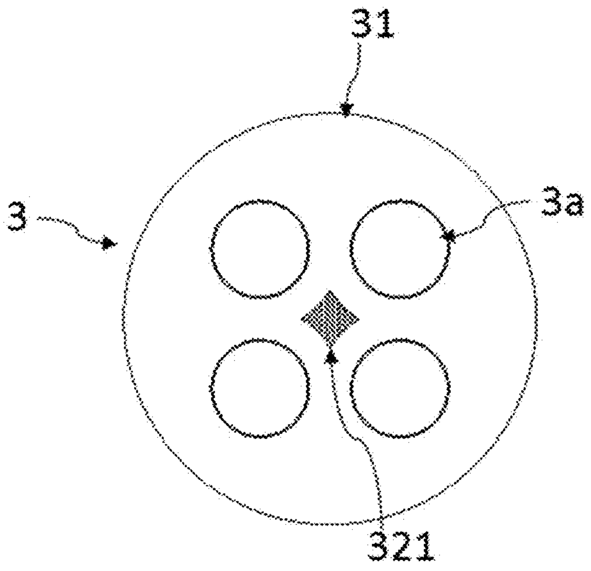
FIG. 4 is a schematic view of a plug in FIG. 1.

With continued reference to FIG. 4, and FIG. 4 is a schematic view of the plug 3 in FIG. 1.

The plug 3 in this embodiment includes an elastic main body 31, and the elastic main body 31 is made of an elastic material, for example, an insulating rubber. The elastic main body 31 in FIG. 1 and FIG. 4 is substantially of a cylindrical structure. The elastic main body 31 is provided with multiple through holes 3*a* for the cables 52 to pass through, and the through holes 3*a* run through both ends of the elastic main body 31 along an axial direction. Four through holes 3*a* are shown in FIG. 4, and it can be known that the number of through holes 3*a* is unlimited, which may also be more than four or less than four. In addition, the plug 3 in this embodiment further includes a support body, and a first support body 321 provided in the elastic main body 31 is shown in FIG. 4. Specifically, the first support body 321 is located in a middle part of the elastic main body 31, and the hardness of the support body is greater than the hardness of the elastic main body 31. Herein, the middle part refers to the middle part of the elastic main body 31 in a radial direction. Hardness is a physics terminology, which refers to the ability of a material to locally resist a hard object from pressing into its surface. The hardness of the support body is greater than the hardness of the elastic main body 31, so that the deformation amount of the support body will be smaller than the deformation amount of the elastic main body 31 when being subjected to the same pressure.

The support body of the plug 3 is embedded within the elastic main body 31, the support body may run through the elastic main body 31 along the axial direction of the plug 3, or may be arranged in a part of the elastic main body 31 along the axial direction. Obviously, the solution that the support body runs through the elastic main body along the axial direction has a better effect on improving the hardness of the entire plug 3.

The support body may be specifically fixed in the elastic main body 31 by adhesive bonding. Taking FIG. 4 as an example, a mounting hole running through the elastic main body 31 along the axial direction is provided, an adhesive may be applied to a hole wall and an outer wall of the first support body 321, and the first support body 321 can be adhesively fixed with the hole wall after being mounted in the mounting hole. Or, the first support body 321 may be fixed to the elastic main body 31 by being embedded and press-fitted in the elastic main body 31, that is, the first support body 321 is press-fitted into the mounting hole by interference fit, so as to be fixed with the elastic main body 31. Or, the first support body 321 may be fixed with the elastic main body 31 by snap-fit, for example, the first support body 321 is integrally formed with the elastic main body 31 through techniques such as injection molding, vulcanization, etc., dimensions of two ends of the first support body 321 may be larger than that of the mounting hole, so that the first support body 321 will not be withdrew from the elastic main body 31, and thus the fixation is realized. It can be seen that there are various ways for the support body to be embedded in the elastic main body 31, which is not limited in this embodiment.

Through analysis, the reason that multiple cables cannot be clamped well in the background art is that the middle part of the elastic main body is insufficiently supported and prone to slack when there're multiple cables, leading to the situation that the multiple cables cannot be clamped well or a greater clamping force is needed. In this embodiment, the first support body 321 is provided in the middle part of the elastic main body 31. In this way, due to the elastic material characteristics of the elastic main body 31, when the claw members 22 are squeezed by the first nut 4 to contract to force the plug 3 from periphery, the plug 3 can generate a certain deformation to be clamped by the claw members 22, and the cables 52 are pressed tightly from an outer side to the middle part. Besides, since the support body provided in the middle part has a higher hardness, which is equivalent to a middle skeleton of the plug 3, it is ensured that the cables 52 are clamped well during the clamping process.

In FIG. 4, the first support body 321 is provided in the middle part of the elastic main body 31, and the elastic main body 31 is provided with multiple through holes 3*a* for mounting the multiple cables 52, and the through holes 3*a* are provided around the first support body 321. When the first nut 4 forces the plug 3 from the periphery, since the cable 52 within the through hole 3*a* has a metal component, a portion of the elastic main body 31 located at an inner side with respect to the through holes 3*a* cannot squeeze the cables 52. That is, the middle part, surrounded by the cables 52, of the elastic main body 31 lacks support. In other words, if the middle part of the elastic main body 31 is also elastic, the middle part is easily deformed under the force, and as a result, the cables cannot be clamped well by the plug. In this embodiment, the first support body 321 is provided in the middle part to better support and cooperate with the elastic main body 31, so as to clamp the cables 52 well.

As shown in FIG. 4, the elastic main body 31 is provided with four through holes 3*a*. In this case, a cross-section of the first support body 321 located in the middle part may be a rhombus, and each side of the rhombus is a concave arc, and the concave arc faces the corresponding through hole 3*a*. Each of the through holes 3*a* also has a circular cross-section, the concave arc and the corresponding through hole 3*a* are provided concentrically. In this way, the concave arc of the first support body 321 matches the shape of the hole wall of the through hole 3*a*, so that the first support body 321 can better bear the squeeze to support the portion of the elastic main body 31 located between the first support body 321 and the through holes 3*a*.

In this embodiment, the material of the first support body 321 may be metal or plastic, and the material is simple and easy to obtain. Of course, as long as the hardness of the first support body 321 is greater than the hardness of the elastic main body 31, the material is not limited to metal or plastic.

With continued reference to FIG. 3, the connector 2 is further provided with a second external thread section 213 at an end away from the claw members 22, and an annular flange 212 is provided between the second external thread section 213 and the first external thread section 211. The connector further includes a second nut 1 that is in threaded engagement with the second external thread section 213. In FIG. 3, a cabinet wall 100 of the cabinet is provided with a mounting hole, the second external thread section 213 of the connector passes through a first side, located at a left side of the cabinet wall 100, of the cabinet wall 100 from left to right, and the annular flange 212 is clamped at a second side, located at a right side of the cabinet wall 100, of the cabinet wall 100, where the first side and second side may be an inner side and an outer side of the cabinet body, or may be an outer side and an inner side of the cabinet body. Then, the second nut 1 and the second external thread section 213 are screwed to be in a threaded engagement, so that the connector can be fixed to the cabinet wall 100. When the cable 52 passes through the through hole 3*a* of the plug 3, the contact pin 51 of the cable 52 can be connected to the electrical element that need to be connected, thereby realizing the communication of the cable 52. Herein, the cabinet may be an electrical cabinet, that is, an electrical enclosure.

Second Embodiment

Figure 5:
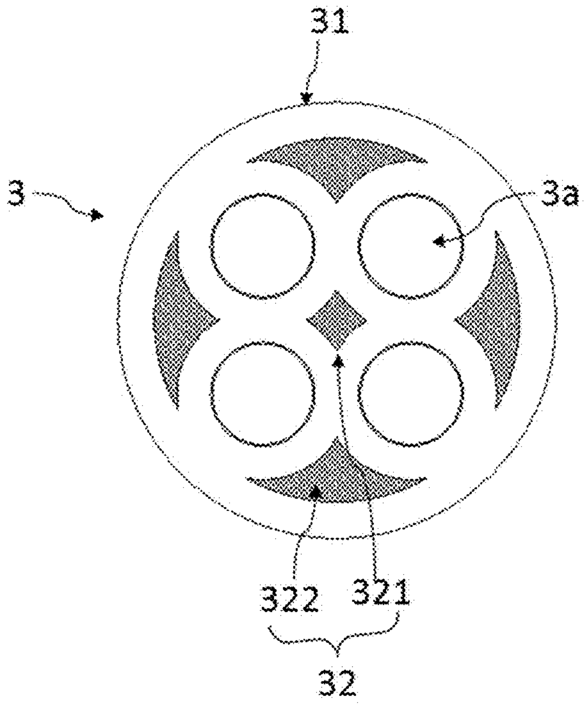
FIG. 5 is a schematic view of a plug according to a second embodiment of the present application.

Please refer to FIG. 5, and FIG. 5 is a schematic view of a plug 3 according to a second embodiment of this application.

This embodiment is substantially the same as the first embodiment, except that the plug 3 includes, in addition to the first support body 321 located in the middle part, a second support body 322 provided at an outer side of the first support body 321. In this way, multiple support bodies are provided in a dispersed manner, so that the elastic main body 31 can be supported more completely and uniformly.

As shown in FIG. 5, the second support body 322 is located on the outer side of the through hole 3*a* ("outer" here refers to a direction away from the middle part of the elastic main body 31) and close to an outer periphery of the elastic main body 31. Further, the second support body 322 faces a portion between adjacent through holes 3*a*. In this way, the second support body 322 can better support a portion of the elastic main body 31 around the cables 52 together with the first support body 321, so that the portion, surrounding the through holes 3*a*, of the elastic main body 31 can be substantially supported. In FIG. 5, each through hole 3*a* is surrounded by two second support bodies 322 and one first support body 321. Of course, it is possible for the through holes 3*a* to be surrounded by more support bodies.

The manner in which the support body is provided around the through holes 3*a* is not limited to the above solutions. For example, the second support body 322 may be at least partially located between adjacent through holes 3*a*, i.e., provided between adjacent through holes 3*a*; alternatively, a portion of the second support body 322 is located between adjacent through holes 3*a*, and another portion is located at the outer side of the through holes 3*a*; alternatively, the second support body is only provided radially outside of the through holes 3*a*. With the above solutions, the second support body 322 can cooperate with the first support body 321 to better support the elastic main body 31 around the cables 52.

In FIG. 5, a profile of the cross-section of the second support body 322 includes two lateral sides and a base side. The two lateral sides are concave arcs and the base side is a convex arc. A position where the two lateral sides meet each other faces a portion between the adjacent through holes 3*a*, and the base side is located at an outer side of the two lateral sides. The through holes 3*a* and the elastic main body 31 each has a circular cross-section, so the concave arcs may match the through holes 3*a*. In this way, it is possible to better match the shape of the hole walls of the through holes 3*a* and adapt to the stress, so as to better support the portion of the elastic main body 31 between adjacent through holes 3*a*, and make full use of the space of the elastic main body 31 to provide a reasonable number and size of support bodies.

It can be understood that the position of the support body is not limited to the arrangement of the first and second embodiments, instead, it may be in other forms. For example, multiple circular cylinders or square cylinders may be arranged in the middle part of the elastic main body 31 as well as between adjacent through holes 3*a* to serve as the support bodies, which will not be described in detail. In addition, the multiple support bodies are connected to each other; or, part of the multiple support bodies are connected to each other, and the other part of the multiple support bodies are independent of each other; or, all the multiple support bodies are independent of each other.

Specific examples have been applied herein to illustrate the principle and embodiments of the present application, and the description of the above embodiments is only used to help understand the method and core concept of the present application. It should be pointed out that, for those skilled in the art, without departing from the principle of the present application, several improvements and modifications can be made to the present application, and these improvements and modifications also fall within the protection scope of the claims of the present application.

The invention claimed is:

1. A plug for a connector, wherein the plug comprises an elastic main body provided with a plurality of through holes for cables to pass through; the plug further comprises a support body, wherein the support body comprises a first support body embedded in the elastic main body, and the plurality of through holes are provided around the first support body; the support body has a hardness greater than that of the elastic main body;

wherein each of the plurality of through holes has a circular cross-section, and each side of a cross-section of the first support body is a concave arc, and the concave arc directly faces a corresponding through hole of the plurality of through holes and is concentric with the corresponding through hole.

2. The plug according to claim 1, wherein the number of the support body is plural, the plurality of support bodies are independent of each other or connected to each other; or, part of the plurality of support bodies are independent of each other, and another part of the plurality of support bodies are connected to each other.

3. The plug according to claim 1, wherein the support body is made of metal or plastic.

4. The plug according to claim 1, wherein the support body further comprises a second support body, the second support body and the first support body are arranged around at least one of the plurality of through holes.

5. The plug according to claim 4, wherein the second support body is located at an outer side of the plurality of through holes.

6. The plug according to claim 5, wherein the plurality of through holes and the elastic main body each has a circular cross-section, and a profile of a cross-section of the second support body includes two lateral sides and a base side which meet one another in sequence; and wherein each of the two lateral sides is a concave arc and the base side is a convex arc, and the concave arc is concentric with a corresponding through hole of the through holes, the convex arc is concentric with the elastic main body, and a position where the two lateral sides meet each other faces a portion between the adjacent through holes.

7. The plug according to claim 4, wherein at least a portion of the second support body is located between adjacent through holes of the plurality of through holes.

8. The plug according to claim 7, wherein the plurality of through holes and the elastic main body each has a circular cross-section, and a profile of a cross-section of the second support body includes two lateral sides and a base side which meet one another in sequence; and wherein each of the two lateral sides is a concave arc and the base side is a convex arc, and the concave arc is concentric with a corresponding through hole of the through holes, the convex arc is concentric with the elastic main body, and a position where the two lateral sides meet each other faces a portion between the adjacent through holes.

9. A connector, comprising: the plug for the connector according to claim 1, a plug, wherein the plug comprises an elastic main body provided with a plurality of through holes for cables to pass through; the plug further comprises a support body, wherein the support body comprises a first support body embedded in the elastic main body, and the plurality of through holes are provided around the first support body; the support body has a hardness greater than that of the elastic main body;

wherein each of the plurality of through holes has a circular cross-section, and each side of a cross-section of the first support body is a concave arc, and the concave arc directly faces a corresponding through hole of the plurality of through holes and is concentric with the corresponding through hole;

wherein the connector further comprises a connecting seat and a first nut, the connecting seat is provided with a first external thread section having external threads, and the first external thread section is connected to a plurality of claw members, and the plug is located in the plurality of claw members, the first nut and the first external thread section are in threaded engagement to drive the claw members to clamp the plug tightly.

10. The connector according to claim 9, wherein one end of the connecting seat away from the claw members is provided with a second external thread section, and the connector is provided with a second nut that is in threaded engagement with the second external thread section.

11. The connector, comprising the plug for the connector according to claim 9, wherein the connector further comprises a connecting seat and a first nut, the connecting seat is provided with a first external thread section having external threads, and the first external thread section is connected to a plurality of claw members, and the plug is located in the plurality of claw members, the first nut and the first external thread section are in threaded engagement to drive the claw members to clamp the plug tightly.

12. The connector, comprising the plug for the connector according to claim 11, wherein the connector further comprises a connecting seat and a first nut, the connecting seat is provided with a first external thread section having external threads, and the first external thread section is connected to a plurality of claw members, and the plug is located in the plurality of claw members, the first nut and the first external thread section are in threaded engagement to drive the claw members to clamp the plug tightly.

13. The connector, comprising the plug for the connector according to claim 12, wherein the connector further comprises a connecting seat and a first nut, the connecting seat is provided with a first external thread section having external threads, and the first external thread section is connected to a plurality of claw members, and the plug is located in the plurality of claw members, the first nut and the first external thread section are in threaded engagement to drive the claw members to clamp the plug tightly.

* * * * *